May 28, 1957 F. E. CARROLL, JR 2,793,708
OIL TANK
Filed Nov. 18, 1954 4 Sheets-Sheet 3
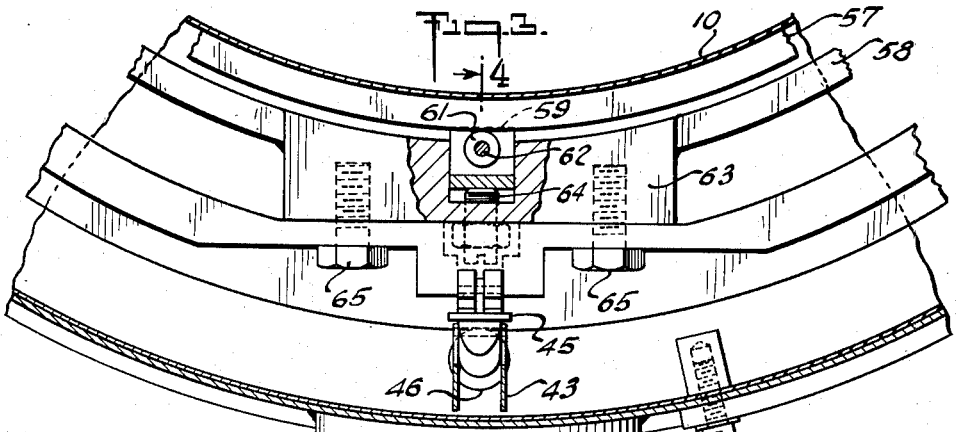
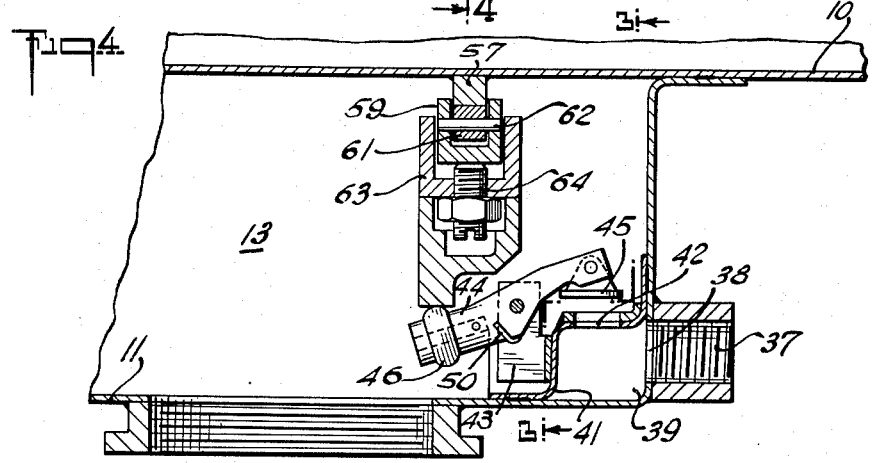
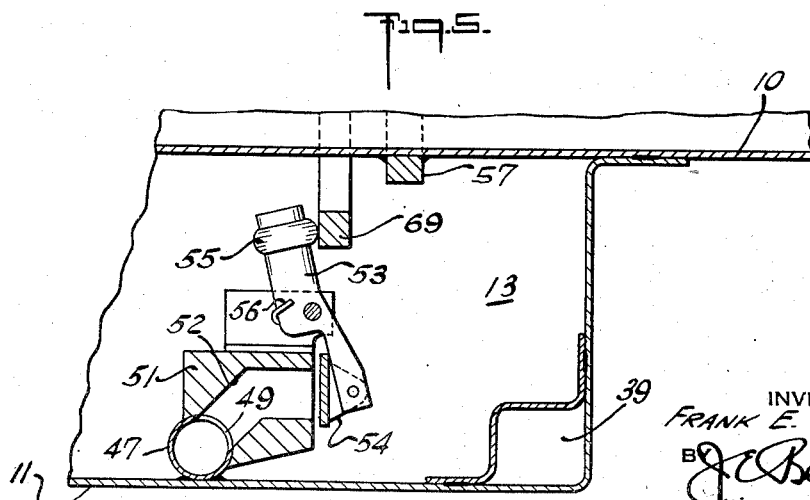
INVENTOR
FRANK E. CARROLL JR.
BY
HIS ATTORNEY May 28, 1957  F. E. CARROLL, JR  2,793,708
OIL TANK
Filed Nov. 18, 1954  4 Sheets-Sheet 4
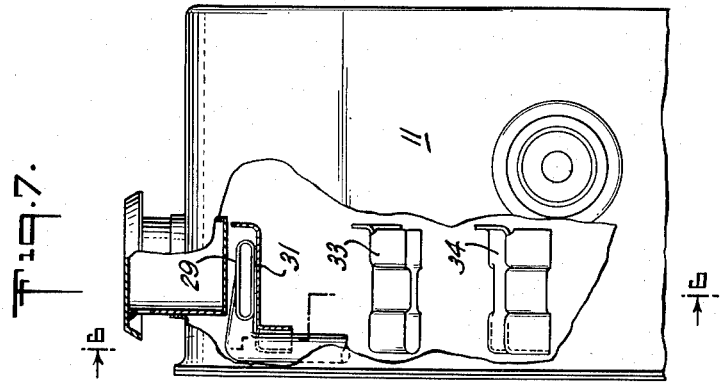
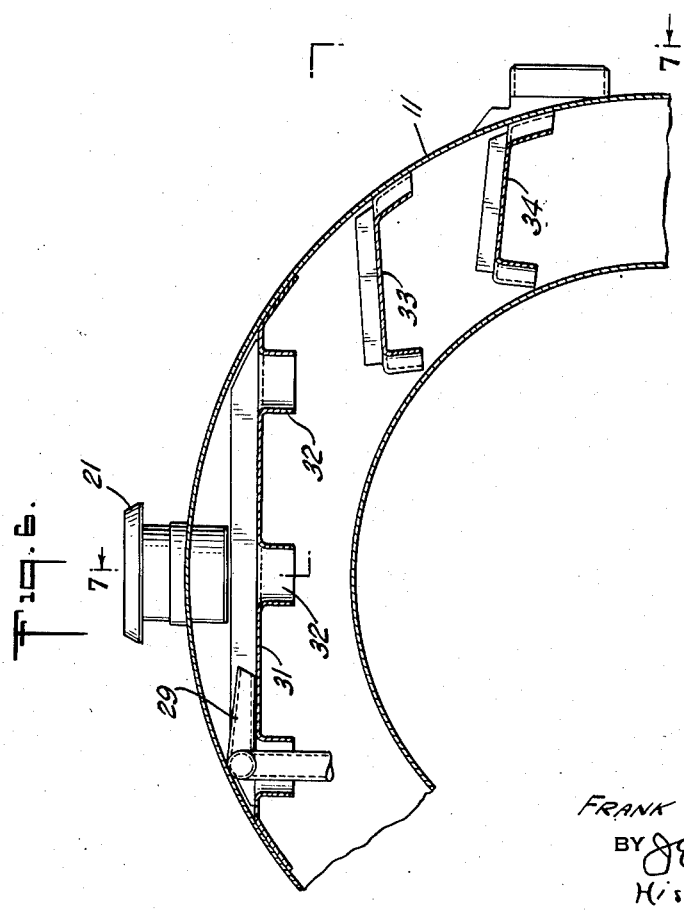
INVENTOR
FRANK E. CARROLL, JR
BY
His ATTORNEY

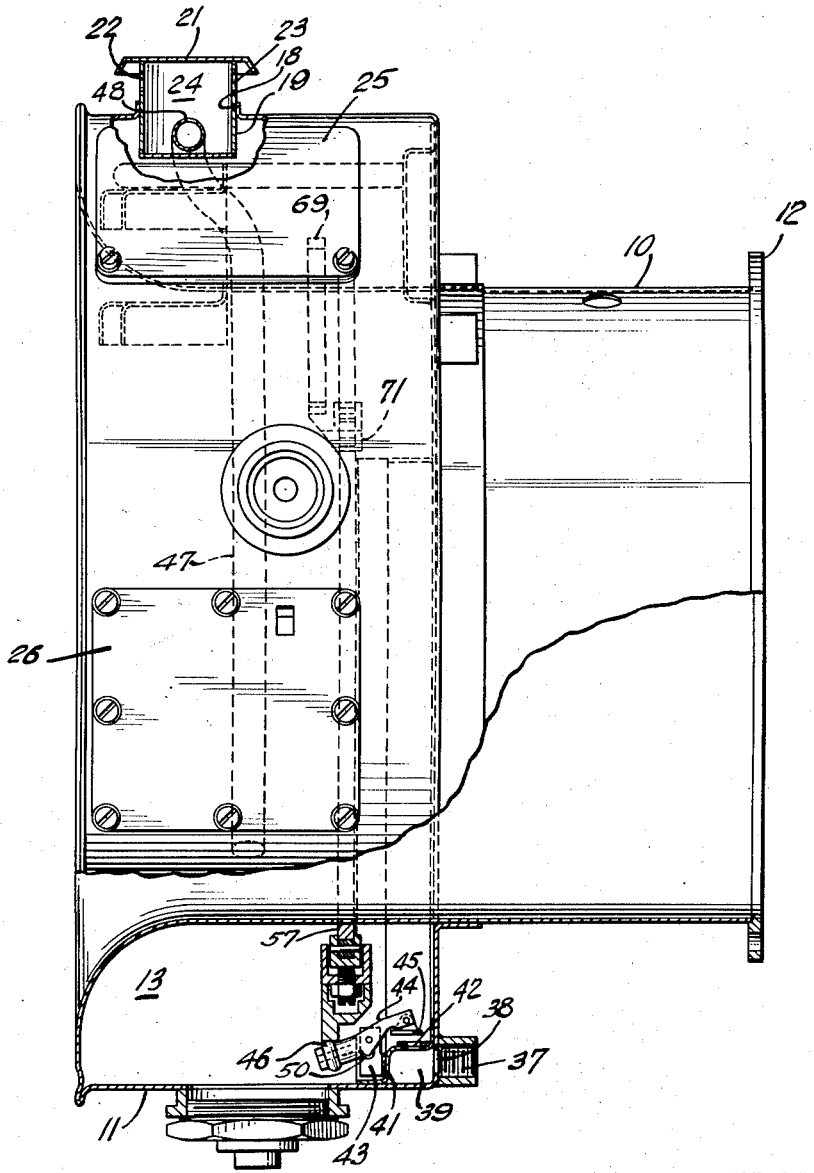

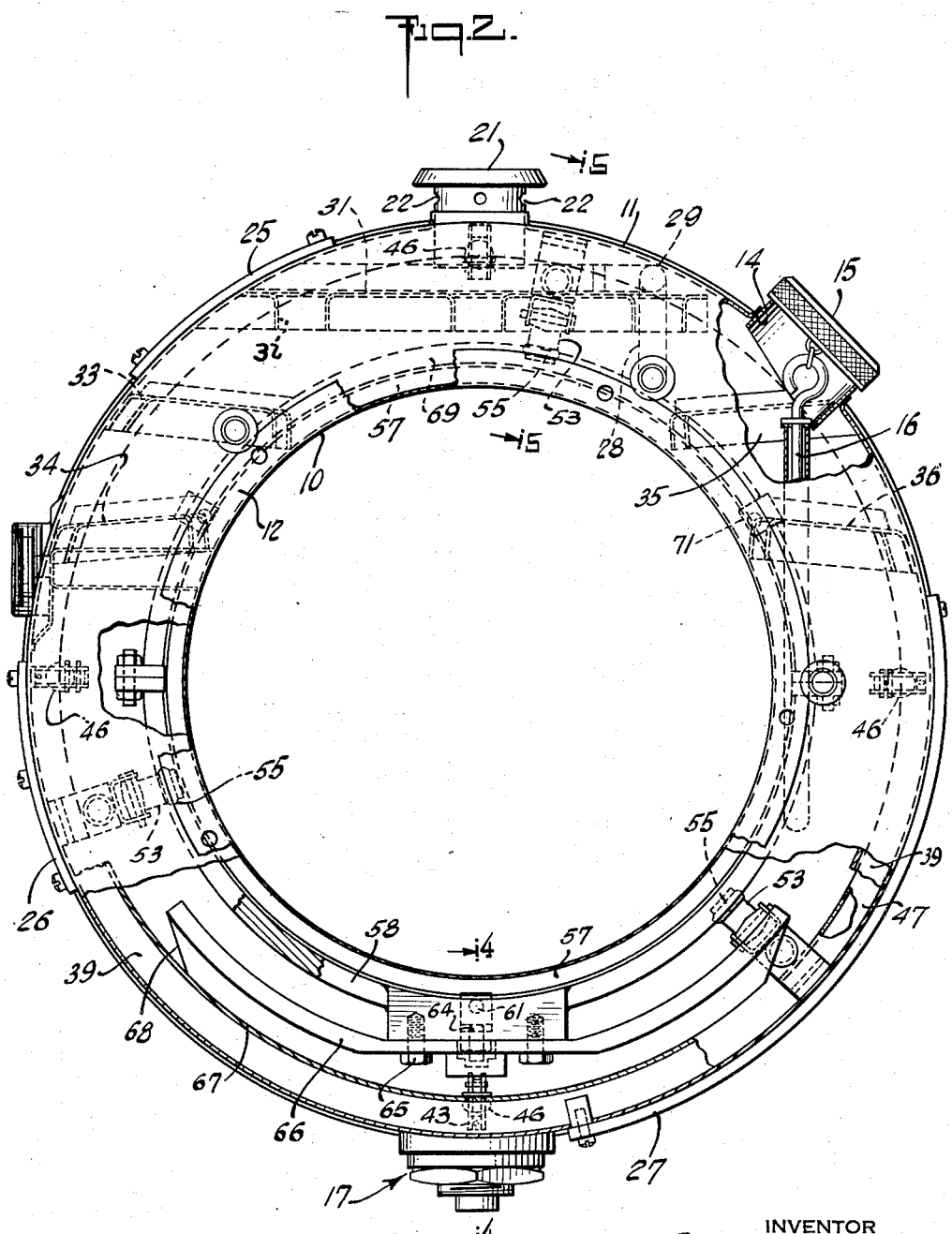

United States Patent Office 2,793,708
Patented May 28, 1957

2,793,708

OIL TANK

Frank E. Carroll, Jr., Dayton, Ohio, assignor to United Aircraft Products, Inc., Dayton, Ohio, a corporation of Ohio Application November 18, 1954, Serial No. 469,734

10 Claims. (Cl. 183—2.5)

This invention relates to liquid storage and supply tanks, and particularly to tank reservoirs as used in the engine lubrication systems of aircraft to hold the supply of lubricating oil.

In such systems the oil is circulated continuously from the tank to the engine and back to the tank, and it is of course important to maintain a steady uninterrupted flow of oil to the engine. Since aircraft in flight assume different flight attitudes, and since the body of contained oil in the tank tends to shift in response to changing flight attitudes, it is necessary to provide an oil outlet opening from the tank which is submerged in all rotary positions of the tank. Further, it is customary to provide in tank reservoirs of the kind described vent openings whereby air released from the returned oil may escape to atmosphere. This too, therefore, presents a complicating factor in that it is desirable to maintain an open vent in the changing flight positions of the tank.

An object of the instant invention is to present a generally new tank structure in which the oil outlet is kept flooded in all flight attitudes and in which the interior of the tank above the oil level constantly is vented to atmosphere in all flight attitudes.

Another object of the invention, in a device of the kind described, is to provide oil flow control valves and venting valves operating in conjunction with one another in such manner that substantially oppositely disposed oil flow control valves and venting valves are open at the same time.

A further object of the invention is to provide for operation of the venting valves and oil flow control valves by a single gravity responsive means.

Still another object of the invention is to provide a tank reservoir of generally new design, featuring a novel arrangement of baffles aiding in the release of entrained air in the returning oil.

Other objects and structural details of the invention will appear from the following description when read in connection with the accompanying drawings, wherein:

Fig. 1 is a view in side elevation of an oil tank in accordance with the illustrated embodiment of the invention, some parts being broken away;

Fig. 2 is a view in front elevation of the oil tank of Fig. 1, some parts being broken away;

Fig. 3 is a detail view in front elevation of a cam mounting, enlarged with respect to Fig. 2;

Fig. 4 is a fragmentary view in cross section, taken substantially along the line 4—4 of Fig. 2 and rotated into a horizontal plane;

Fig. 5 is a fragmentary view in cross section, taken substantially along the line 5—5 of Fig. 2 and rotated into a horizontal plane;

Fig. 6 is a fragmentary view of the upper part of the tank, taken from the opposite side thereof from Fig. 2 and having the front of the tank shell removed to show the baffle structure, other details of the tank being omitted in order that the tank structure may more clearly be seen; and Fig. 7 is a view in cross section, taken substantially along the line 7—7 of Fig. 6 and with a part of the shell of the tank broken away.

Referring to the drawings, the oil tank in its illustrative embodiment has a generally annular appearance, the principal framing elements of the tank including or being an open ended cylinder 10 and a circular right angle member 11 mounted on the cylinder 10. At its one end the cylinder 10 has a mounting flange 12. The other end thereof flares outward and terminates in a joint with the free end of the angle member 11. Together, therefore, the cylinder 10 and member 11 define an annular space 13 which is the oil storage chamber.

The normal oil level in the chamber 13 lies slightly above the medial horizontal plane thereof. The chamber initially is filled and is refilled as necessary by way of an opening 14 in the member 11 closed by a removable cap 15 to which is attached a measuring or dip stick 16. A drain fitting 17, including a removable closure cap, is installed in the member 11 at the bottom thereof, as seen in the drawing, or a circumferential distance some 120° removed from the fill opening 14. In the upper part of the member 11, or diametrically opposed from the drain fitting 17, is an opening 18 in which is installed a cup shaped element 19 covered by a lid 21 and having side vent openings 22 and 23. The element 19 and cover plate 21 therefor define what may be termed a vent chamber 24. The framing element 11 has other openings, provided for access to the interior of the chamber 13, and these are suitably closed by removable plates 25, 26 and 27.

Oil returning to the tank from the engine enters by way of an opening 28 in the element 11 and is conducted by way of a conduit 29 to the upper part of the chamber 13 where it is permitted to spill out upon a baffle 31 extending from side to side of the element 11 across the top of the cylinder 10. The baffle 31 has openings 32 which allow the oil to drop downward upon the cylinder 10 where it divides into separate streams, flowing in opposite directions over the cylinder toward the main body of contained oil. In so flowing, each stream encounters other baffles 33 and 34 and 35 and 36, all arranged in a manner substantially parallel to the baffle 31 and having holes similar to the holes 32 for the continued downward travel of the oil. It will be recognized that the baffles described serve successively to spread out the returning oil in relatively flat flowing streams for better release of entrapped air.

Oil flowing from the tank to the engine is withdrawn by way of an outlet fitting 37 communicating through an opening 38 with a manifold chamber 39 defined by a circular angle piece 41 mounted in the corner of framing element 11. The angle piece 41 has four, approximately equally spaced apart openings 42 by which the manifold chamber 39 communicates with the storage chamber 13. Substantially aligned with each opening 42, and also mounted on the angle piece 41, is a bracket 43 on which is pivotally mounted an arm 44. On one end of each of the arms 44, in position to overlie its respective opening 42, is a valve element 45. On the other end of each of the arms 44 is an enlarged roller like portion 46. It will be understood that a rocking motion of the arm 44 serves alternately to seat and to unseat the valve element 45 with respect to angle piece 41 and thereby alternately to close and to open the opening 42. Torsion spring means 50 urges each of the arms 44 in a clockwise direction as seen in Fig. 1, or in a direction to maintain the opening 42 normally closed.

Venting of the chamber 13 is effected through another manifold conduit 47 having the shape of an arcuate pipe suitably affixed to the outer wall of framing element 11 within chamber 13. The conduit 47 passes through the cup shaped element 19 and communicates through an opening 48 with venting chamber 24 therein. The manifold conduit 47 has other openings 49 substantially equally spaced apart along the length thereof. Body elements 51 are also mounted on the manifold pipe 47, there being one such body for each opening 49. A passage 52 in each body 51 registers at its one end with a respective opening 49 and at its other end opens into the storage chamber 13. Pivotally mounted on each body 51 is an arm 53 carrying on one end a valve element 54 and having on its other end an enlarged roller portion 55. According to the construction and arrangement of parts, as was seen in the case of arms 44, a rocking motion of the arms 53 is effective alternately to close and to open the passages 52 and thereby alternately to communicate the manifold pipe 47 with the chamber 13. Torsion springs 56 urge the arms 53 in a direction normally to close the passages 52.

The arms 44 and the arms 53 are selectively rocked to open positions by means interconnected for unison movement in response to gravity forces. Thus, there is installed on the exterior of the framing cylinder 10, within the chamber 13, a ring shaped rail 57 serving as a track. The rail 57 is secured to the cylinder 10, as by welding. In surrounding relation to the rail 57 is a sectional ring in which at circumferentially spaced apart points is interposed a series of yokes 59. The yokes 59 form a rigid part of the ring 58 and their sides extend in partly embracing relation to the rail 57. Also, the yokes 59 have a roller 61 installed therein by means of a pin 62. The arrangement is such as to permit the ring 58 to ride freely upon the rail 57, that is, the ring is relatively and easily rotatable with respect to the rail 57 and thereby with respect to the tank structure of which the rail 57 is a part.

In the lower part of the tank, one of the yokes 59 is received in and in effect made a part of a bracket 63 to the opposite ends of which ends of the ring 58 are connected as by welding so that the bracket 63 is included in and made a part of the relatively rotatable ring. The yoke 59 may be adjusted relatively to the bracket 63, as may be required, by means of a set screw 64 engaging the bottom of the yoke through the bracket 63.

Mounted on the bottom of the bracket 63, as by bolts 65, is an arcuately shaped pendulum-like weight 66 presenting a long and curved cam edge 67 terminating at its opposite end in inclined portions 68. The surfaces 68 and edge 67 are in line with and are adapted to engage the enlarged roller portions 46 on the arms 44 and arrangement of parts is such that the arms 44 may thereby be rocked against the urging of springs 46 to an open position with respect to the openings 42. The operation of opening the valve arms 44 is a selective one, the weight 66 being so proportioned and the arms 44 being so disposed that the cam edge 67 is in position at all times to engage and open at least one of the arms 44. In the position of the tank illustrated, the cam edge is in position to actuate the valve arm 44 at the bottom of the tank. In the event of a changing flight attitude, however, causing the oil tank to turn some 90° to 180° from the illustrated position, the valve arm now being actuated by the cam edge 67 will be carried out from under such cam edge and will immediately move to closed position by virtue of the action of torsion spring 50. At or about the same time that this occurs, however, the next succeeding valve arm 44 is brought into the area of the weight 66 and the roller portion 46 thereof engages surfaces 68 and 67 with the result that this valve arm is moved to open position. Thus, the storage chamber 13 is at all times in communication with outlet manifold chamber 39 through one or another of the openings 42. Those openings 42, however, which by reason of the position of the tank may be located above the level of the contained oil are closed by their respective valves 44—45 so that no air may be drawn into the lubrication system.

The venting valve arms 53 are actuated by an auxiliary ring member 69 attached by mounting brackets 71 to the ring 58 to extend in parallel offset relation to the ring 58 but to be movable therewith. The auxiliary ring 69 extends arcuately over the upper portion of the tank, in the position of the parts illustrated, in generally opposed relation to the pendulum weight 66. The auxiliary ring is, moreover, proportioned in the manner of the pendulum weight 66 to engage and hold open at least one of the vent valve arms 53. Thus, as rotation of the tank carries one of the vent valve arms 53 out of cooperative relation with the auxiliary ring 69, another such vent valve arm is being brought into cooperative relation with such auxiliary ring so that communication of the storage chamber 13 with the vent chamber 24 is continuous in all attitudes of the tank. It will be understood, further, that the location of the auxiliary ring 69 is such as to open a vent valve which is above the level of the contained oil and to permit the other vent valves to maintain a closed position.

What is claimed is:

1. An oil tank which in use assumes different attitudes relatively to the surface of the earth, comprising a tank structure defining a storage chamber, an oil outlet manifold supported by said tank structure in peripherally extending relation to said storage chamber in surrounding relation to the center thereof and communicating at a plurality of circumferentially spaced apart points with said storage chamber, valves at said points controlling flow from said chamber into said manifold, and pendulum means mounted on and movable relatively to said tank structure for operating said valves.

2. An oil tank which in use assumes different attitudes relatively to the surface of the earth, comprising a tank structure defining a storage chamber, a vent manifold communicating at a plurality of spaced apart points with the interior of said storage chamber, valves at said points, and pendulum means mounted on and movable relatively to said tank structure for operating said valves.

3. An oil tank which in use assumes different attitudes relatively to the surface of the earth, comprising a tank structure defining a storage chamber, an oil outlet from said chamber and a vent outlet from said chamber, manifolds leading respectively to said outlets and each communicating at spaced apart points with the interior of said storage chamber, normally closed valves controlling flow into said manifolds, and gravity responsive means supported on said tank structure selectively to open said valves.

4. An oil tank which in use assumes different attitudes relatively to the surface of the earth, comprising a tank structure defining a storage chamber and an oil outlet therefrom, a manifold supported by said tank structure in peripherally extending relation to said storage chamber in surrounding relation to the center thereof and leading to said outlet and communicating at circumferentially spaced apart points with the interior of said storage chamber, normally closed valves controlling flow into said manifold from said chamber, and gravity responsive means supported on said tank structure selectively to open said valves.

5. An oil tank which in use assumes different attitudes relatively to the surface of the earth, comprising a tank structure defining a storage chamber and a vent outlet therefrom, a manifold leading to said outlet and communicating at spaced apart points with the interior of said storage chamber, normally closed valves controlling flow into said manifold from said chamber, and gravity responsive means supported on said tank structure selectively to open said valves.

6. An oil tank for use in an engine lubricant circulating system, said tank in use assuming different attitudes relatively to the earth's surface, comprising a ring shaped tank structure defining an annular storage chamber, an oil inlet and an oil outlet located respectively in upper and lower parts of the tank structure, a series of baffles directing incoming oil in divergent cascading streams toward said outlet, a vent in the upper part of said tank for discharge of air released from said stream, an arcuately extending manifold communicating with said vent and with spaced apart areas of the interior of said storage chamber between said inlet and said outlet, valves controlling communication of said manifold with the interior of said storage chamber, and gravity responsive means mounted on said tank structure selectively to open said valves in accordance with the attitude of the tank.

7. An oil tank which in use assumes different attitudes relatively to the earth's surface, comprising a ring shaped tank structure defining an annular storage chamber, means defining a manifold chamber extending about the circumference of said storage chamber and having communication with the exterior of said storage chamber and communication also at spaced apart points with the interior of said storage chamber, a series of valves controlling communication of the interior of said storage chamber with said manifold chamber, and gravity responsive means on said tank structure for controlling selectively the opening and closing of said valves in accordance with the attitude of said tank.

8. An oil tank according to claim 7, wherein said valves are normally closed, characterized in that said valves and said gravity responsive means are so arranged as to maintain at least one of said valves always open.

9. An oil tank which in use assumes different attitudes relatively to the earth's surface, comprising a ring shaped tank structure defining an annular storage chamber, manifold means communicating with the exterior of said storage chamber and at spaced apart points with the interior of said storage chamber, normaly closed valves controlling communication of said storage chamber with said manifold means, said valves being located in arcuate series conforming to the configuration of said chamber, an annular track on the wall of said chamber, and gravity responsive cam means on said track for opening and holding open said valves selectively in accordance with the attitude of said tank.

10. An oil tank according to claim 9, characterized in that said manifold means comprises separate manifold and individual valve controlled openings in each of said manifolds communicating with the interior of said chamber, said cam means being arranged to open at least one of the valves associated with each of said manifolds in any attitude of said tank.

References Cited in the file of this patent

UNITED STATES PATENTS

| | | |
|---|---|---|
| 2,409,223 | Parker | Oct. 15, 1946 |
| 2,586,671 | Landis | Feb. 19, 1952 |
| 2,642,949 | Tyskewicz | June 23, 1953 |
| 2,662,538 | Cervine et al. | Dec. 15, 1953 |